(No Model.)
C. A. CONKLIN.
COFFIN FASTENER.
No. 456,401. Patented July 21, 1891.
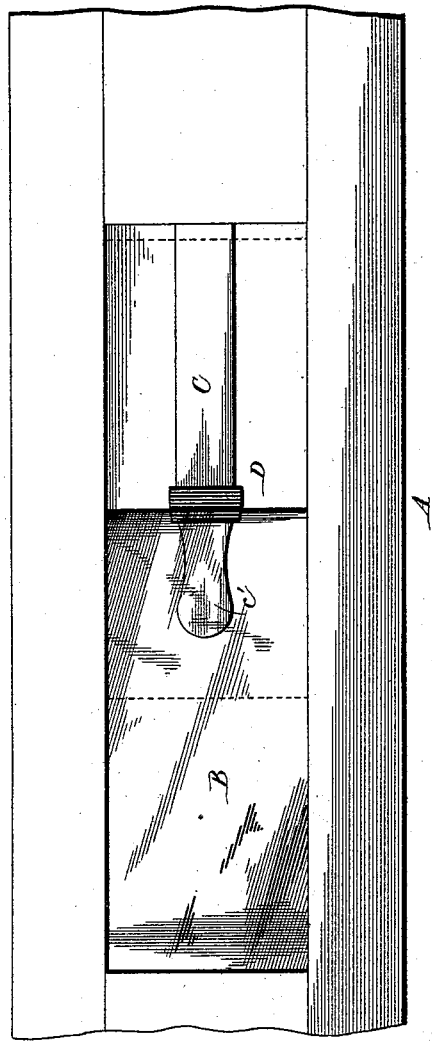
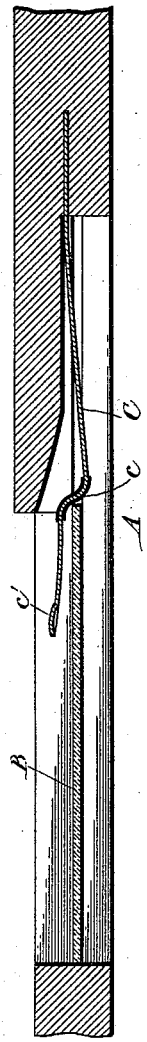
Witnesses
Will F. Norton
Jona B. Lilley
Inventor
Charles A. Conklin
By his Attorney
Franck D. Johns

UNITED STATES PATENT OFFICE.

CHARLES A. CONKLIN, OF ADRIAN, MICHIGAN.

COFFIN-FASTENER.

SPECIFICATION forming part of Letters Patent No. 456,401, dated July 21, 1891.

Application filed March 15, 1890. Serial No. 343,965. (No model.)

*To all whom it may concern:*

Be it known that I, CHARLES A. CONKLIN, a citizen of the United States, residing at Adrian, in the county of Lenawee and State of Michigan, have invented certain new and useful Improvements in Locking Devices for the Sliding Glass of Coffin-Lids; and I do hereby declare the following to be a full, clear, and exact description of the invention, such as will enable others skilled in the art to which it appertains to make and use the same.

My invention relates to certain improvements in spring-locking devices for the sliding glass used in caskets or coffin-lids; and it consists, essentially, in covering that portion of the spring which comes in contact with the glass with any soft or yielding substance, such as rubber, by means of which the spring is prevented from scratching or breaking the glass and renders the operation of moving said glass noiseless.

The particular construction and arrangement of my said invention I will now proceed to point out and describe, reference being had to the accompanying drawings, in which—

Figure 1 is a longitudinal section of the lid of a coffin provided with my invention, the portion of the lid over the glass being removed and dotted lines indicating the position of the lid and glass when the glass is moved back from the head of the coffin. Fig. 2 is a bottom plan view of said lid and attachments.

Referring to said drawings, A represents the lid of a casket or coffin of any desired construction, the direction of the arrow indicating the head of the casket.

B is a sliding glass such as is ordinarily used and mounted in grooves on the sides of the lid. The portion of the lid over the glass when closed is removed in the present instance.

C is a locking-spring, which in the present instance, as shown in the drawings, consists of a flat leaf-spring attached at one end to the under side of the lid and having a shoulder c, adapted to engage the edge of the glass to keep the same closed.

c' is a thumb-latch on the free end of the spring, by means of which said spring may be raised to disengage the locking-shoulder and permit the glass to be slid back to open the window. The locking-shoulder and that portion of the spring which comes in contact with the glass I provide with a cover D, of rubber, cloth, or any other suitable soft material. As the glass is moved back or forward the soft covering engages with said glass, preventing the spring from scratching or breaking the same, and at the same time rendering the operation of moving the glass window noiseless.

Instead of the particular form of spring described, any other spring-lock may be used, the gist of my invention being in covering that part of the spring-lock which comes in contact with the glass with soft material. I therefore do not desire to be understood as limiting myself to the specific construction shown; but

What I claim as new, and desire to secure by Letters Patent, is—

A locking-spring for the sliding glass of a casket-lid, consisting of a flat leaf-spring C, having a locking-shoulder c, adapted to engage the glass, and provided with a covering D, of suitable soft material, substantially as shown and described.

In testimony whereof I affix my signature in presence of two witnesses.

CHARLES A. CONKLIN.

Witnesses:
 R. B. ROBBINS,
 A. E. BARAGAR.